Feb. 27, 1968   P. A. A. KETZER   3,370,419
DEVICE FOR PURIFICATION OF THE EXHAUST GASES OF
INTERNAL COMBUSTION ENGINES
Filed June 27, 1966
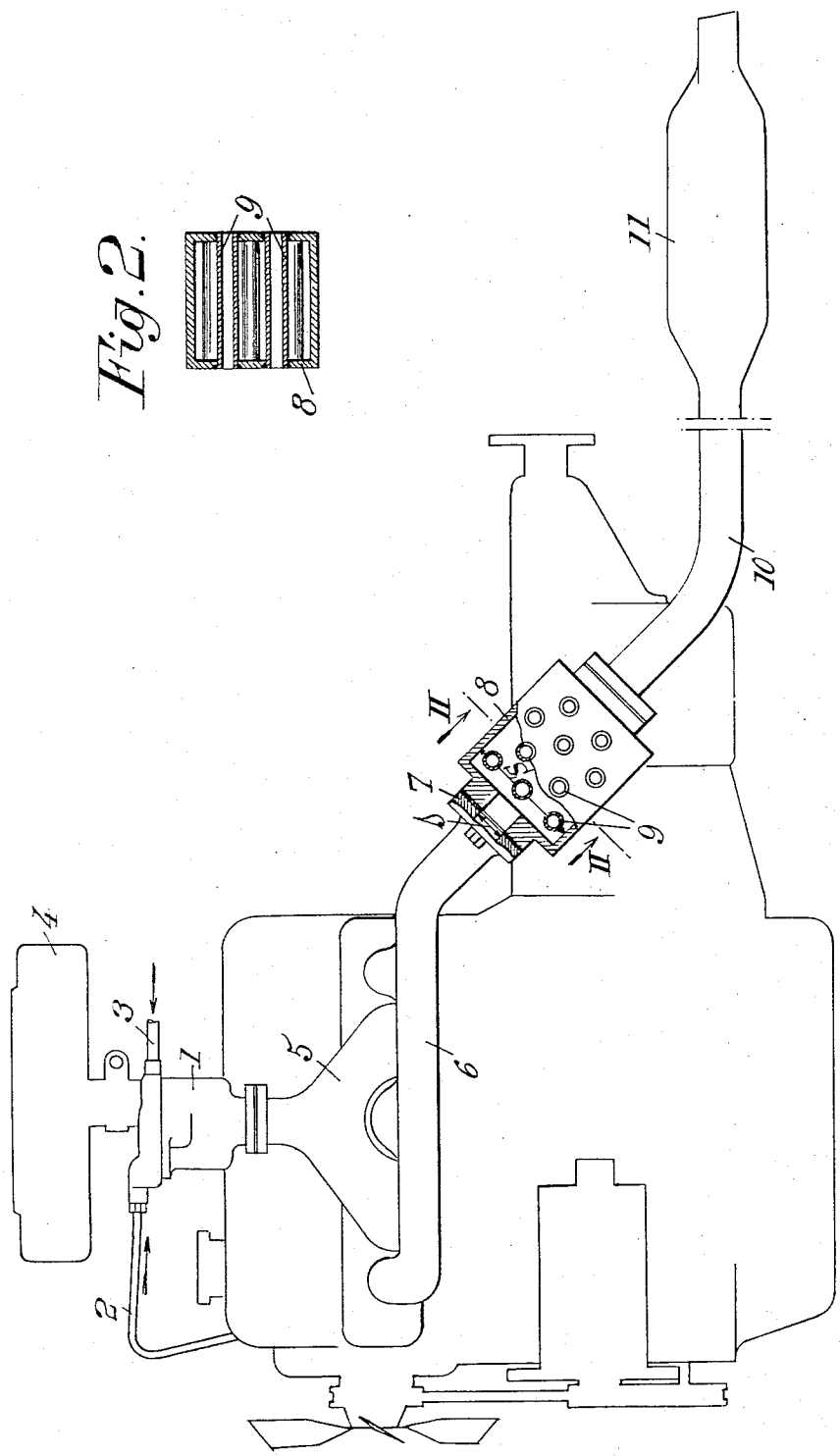

3,370,419
DEVICE FOR PURIFICATION OF THE EXHAUST
GASES OF INTERNAL COMBUSTION ENGINES
Paul Augustin Albert Ketzer, 191 Rue de Courcelles 17,
Paris, France
Filed June 27, 1966, Ser. No. 560,451
7 Claims. (Cl. 60—30)

ABSTRACT OF THE DISCLOSURE

In an internal combustion engine, the combination of means for introducing into a combustion cylinder of said engine a liquid fuel and a liquid catalyst for favoring combustion, said catalyst being capable of retaining at least some of its catalyzing power on passing through said cylinder, an exhaust circuit for the exhaust of the exhaust gases from said engine into the atmosphere, and baffle means disposed in said exhaust circuit, at a region where the temperature of the exhaust gases is normally at least 500° C., for collecting at least a portion of the catalyst carried along by the exhaust gases.

---

The present invention relates to devices for the purification of the exhaust gases of internal combustion engines this last mentioned term including both explosion engines and gradual combustion engines (diesel engines).

The object of the present invention is to provide an improved device of this kind.

It is known to provide means for introducing into the cylinders of an internal combustion engine a mixture of a liquid fuel and of a liquid catalyst. The present invention consists in providing a device of this kind, in a portion of the exhaust pipe of the engine where the temperature of the gases is normally at least 500° C. with baffles capable of collecting, at least partly, the catalyst carried along by the exhaust gases, in order to facilitate the combustion of the non-burnt products contained in these gases either in contact with, or downstream of, these baffles.

A preferred embodiment of my invention will be hereinafter described with reference to the appended drawings, given merely by way of example, wherein, FIG. 1 is a diagrammatic elevational view, with parts in section, of an internal combustion engine provided with a purification device made according to the present invention;

FIG. 2 is a cross-section on the line II—II of FIG. 1.

The device is made of any suitable manner to include means for introducing into the engine cylinders a mixture of liquid fuel and of liquid catalyst.

Taking for instance the case of an explosion engine, said means include a carburetor 1 receiving gasoline through a pipe 2, catalyst through a pipe 3 and air through a filter 4, this carburetor forming a mixture of these three fluids, which mixture is fed to the engine cylinder through an intake manifold 5.

As liquid catalyst, I may use, dissolved in a suitable liquid solvent, a heavy metal derivative of β-diketones, of the type:

$$R.CO.CHR_1.CO.R_2$$

where R, $R_1$ and $R_2$ are hydrocarbon radicals which may also include halogen atoms as substituents. The heavy metals consist as a rule of iron, nickel, cobalt, chromium and lead, or again copper, manganese, molybdenum, vanadium and tungsten. The ratio of the weight of liquid catalyst to that of fuel averages 1/1000 and that of the above mentioned derivative to it solvent ranges approximately from 1 to 2%.

Now, according to the present invention, I provide in the portion of the engine exhaust pipe where temperature of the gases is normally at least 500° C., baffles capable of collecting at least partly the catalyst carried along by exhaust gases.

In what follows it will be supposed that an existing internal combustion engine, including an exhaust manifold 6 with a flange 7 for the fixation of an exhaust pipe, is to be modified. For this purpose I remove the existing exhaust pipe (which will be hereinafter called "standard exhaust pipe") and I adapt to flange 7, through which normally flow gases at 500° C. or more, a post-catalysis casing 8 containing the above mentioned baffles.

Said baffles may be constituted by metal bars or tubes 9 fixed, in particular by welding, to the walls of casing 8 and extending transversely with respect to the direction of flow of the gases. Said casing may, for instance, have a rectangular or square cross-section as illustrated by FIG. 2.

I may also make use of baffles of a ceramic material capable of resisting to temperatures averaging 600° C.

It is of interest to give the inner free cross-section S of casing 8, at the place of the baffles, a value higher than the inner free cross-section s of the flange 7 of the exhaust manifold, so as to avoid a counter-pressure due to the presence of the baffles.

In some cases, it is of interest to provide air inlet orifices in casing 8 for combustion of the products that have not yet burned and/or to provide said casing with a heat-insulating layer.

To casing 8 is secured an exhaust pipe 10, the shape and dimensions of which correspond to these of the portion of the standard exhaust pipe which is not occupied by casing 8, this pipe 10 generally including a silencer element.

It may be of interest to provide independent heating means to keep the temperature of the baffles to a value at least equal to 500° C. during the operation of the engine, such heating means consisting, for instance, of an electrical resistor adapted to be fed with current when the engine is in operation. In this way I obtain a better combustion of the free carbon or of the carbon monoxide, especially during engine acceleration.

The baffles may be constituted, in replacement or in adjunction to metal bars or tubes 9, by fixed helical elements the axis of which is substantially parallel to the direction of flow of the exhaust gases. These helical baffles give the exhaust gases a whirl-wind movement, projecting onto the walls of the exhaust casing the particles of carbon in suspension, which further improves the combustion of the non-burnt products.

I thus obtain a purification device wherein the catalyst, by collecting on the baffles, improves the combustion. This is demonstrated not only by analysing the gases issuing from the silencer, but also by measuring the temperature of the gases at the outlet of casing 8. Experiments have shown that this temperature is higher by about 50° C. than the temperature measured at the same level in a standard exhaust pipe. This increase of the temperature shows the efficiency of the post-catalysis due to baffles 9, and besides it facilitates this post-catalysis.

As above stated, the purification device according to the present invention applies both in the case of explosion engines, for which it reduces the toxicity of the exhaust gases and in the case of diesel engines, for which it reduces the emission of smoke.

In a general manner, while I have in the above description disclosed what I deem to be a practical and efficient embodiment of the invention, it should be well understood that I do not wish to be limited thereto as there might be changes made in the arrangement, disposition and form of the parts without departing from the prin-

What I claim is:

1. In an internal combustion engine, the combination of means for introducing into a combustion cylinder of said engine a liquid fuel and a liquid catalyst for favoring combustion, said catalyst being capable of retaining at least some of its catalying power on passing through said cylinder, an exhaust circuit for the exhaust of the exhaust gases from said engine into the atmosphere, and baffle means disposed in said exhaust circuit, at a region where the temperature of the exhaust gases is normally at least 500° C., for collecting at least a portion of the catalyst carried along by the exhaust gases.

2. An internal combustion engine according to claim 1, wherein said exhaust circuit comprises an exhaust manifold having a flange at the outlet thereof and a casing communicating with said outlet manifold through said flange, said baffle means being mounted in said casing and extending transversely to the direction of flow of said exhaust gases through said casing.

3. An internal combustion engine according to claim 2, wherein said baffle means are metallic.

4. An internal combustion engine according to claim 2, wherein said baffle means are made of a ceramic material.

5. An internal combustion engine according to claim 2 wherein at the level of the baffles, the inner free cross-section of said casing has a value higher than the inner free cross-section of said exhaust pipe flange.

6. An internal combustion engine according to claim 2 wherein said casing is provided with air inlet orifices.

7. An internal combustion engine according to claim 2 wherein said casing is heat insulated.

References Cited

UNITED STATES PATENTS

| 1,903,803 | 4/1933 | Barker. | |
| 2,999,485 | 9/1961 | Lundy | 123—119 |
| 3,091,920 | 6/1963 | Matvay | 60—30 |

FOREIGN PATENTS

| 942,055 | 11/1963 | Great Britain. |

RALPH D. BLAKESLEE, *Primary Examiner.*